United States Patent
Bhogal et al.

(10) Patent No.: US 9,088,655 B2
(45) Date of Patent: Jul. 21, 2015

(54) AUTOMATED RESPONSE SYSTEM

(71) Applicant: International Business Machines Corporation, Armonk, NY (US)

(72) Inventors: Kulvir S. Bhogal, Pflugerville, TX (US); William A. Griffith, Austin, TX (US); Indran Naick, Cedar Park, TX (US); Mark W. Talbot, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/953,023

(22) Filed: Jul. 29, 2013

(65) Prior Publication Data

US 2015/0030141 A1    Jan. 29, 2015

(51) Int. Cl.
  H04M 1/64  (2006.01)
  H04M 3/51  (2006.01)
  H04M 3/523  (2006.01)
  H04M 3/493  (2006.01)
  G10L 15/00  (2013.01)

(52) U.S. Cl.
  CPC .......... *H04M 3/5166* (2013.01); *H04M 3/4936* (2013.01); *H04M 3/5235* (2013.01)

(58) Field of Classification Search
  CPC .............. H04M 1/271; H04M 1/6505; H04M 2201/40; H04M 2203/253; H04M 3/533; H04M 3/53333; H04Q 3/625
  USPC ............................. 379/88.01–88.19; 704/231
  See application file for complete search history.

(56) References Cited

U.S. PATENT DOCUMENTS

| | | | |
|---|---|---|---|
| 5,822,405 A * | 10/1998 | Astarabadi ................. | 379/88.04 |
| 6,577,881 B1 * | 6/2003 | Ehara ........................... | 455/563 |
| 6,963,637 B2 | 11/2005 | Broussard et al. | |
| 7,177,795 B1 * | 2/2007 | Chen et al. .................... | 704/9 |
| 7,616,758 B2 | 11/2009 | Punjabi | |
| 8,223,931 B1 | 7/2012 | Lavian et al. | |
| 8,588,377 B2 * | 11/2013 | Shaffer et al. .............. | 379/88.04 |
| 8,880,120 B1 * | 11/2014 | Lavian et al. .............. | 455/556.1 |
| 2008/0304639 A1 | 12/2008 | McDonough et al. | |

(Continued)

FOREIGN PATENT DOCUMENTS

CN    101827144 A    9/2010

OTHER PUBLICATIONS

U.S. Appl. No. 13/955,298, Non-Final Office Action, Sep. 3, 2014, 11 pg.

(Continued)

*Primary Examiner* — Fan Tsang
*Assistant Examiner* — Solomon Bezuayehu
(74) *Attorney, Agent, or Firm* — Cuenot, Forsythe & Kim, LLC

(57) ABSTRACT

Automated response processing includes receiving a first audible prompt from a called system and a response to the first audible prompt from a calling system during a first phone call. Automated response processing further includes determining, using a processor, a semantic identifier for the first audible prompt using semantic analysis and storing the semantic identifier of the first audible prompt in association with the response. The stored response is played responsive to determining that a semantic identifier for a second audible prompt played to the calling system matches the semantic identifier of the first audible prompt.

17 Claims, 4 Drawing Sheets

(56) References Cited

U.S. PATENT DOCUMENTS

| | | |
|---|---|---|
| 2009/0154666 A1 | 6/2009 | Rios et al. |
| 2010/0145710 A1* | 6/2010 | Tremblay ................. 704/275 |
| 2010/0285848 A1* | 11/2010 | King ....................... 455/574 |
| 2010/0296638 A1* | 11/2010 | Wang ..................... 379/88.04 |
| 2011/0149948 A1* | 6/2011 | Johnston et al. ........... 370/352 |
| 2011/0307252 A1* | 12/2011 | Ju et al. ................... 704/232 |
| 2012/0008755 A1* | 1/2012 | Mittal ..................... 379/93.01 |
| 2013/0022191 A1 | 1/2013 | Or-Bach et al. |
| 2013/0231179 A1* | 9/2013 | Sproule et al. ................ 463/29 |
| 2013/0301821 A1* | 11/2013 | Gilzean et al. .......... 379/201.01 |
| 2015/0030143 A1 | 1/2015 | Bhogal et al. |

OTHER PUBLICATIONS

U.S. Appl. No. 13/955,298, Notice of Allowance, Mar. 3, 2015, 11 pg.

* cited by examiner

AUTOMATED RESPONSE SYSTEM

BACKGROUND

When a telephone call is answered by an automatic attendant, the calling party must provide a series of inputs in order to navigate an audible menu hierarchy to reach an intended endpoint. For example, whether attempting to reach a particular department or a representative within an organization, the calling party typically selects among various audible menu options, enters identifying information, and the like. When the calling party calls the same phone number at some point in the future, whether as a result of a mistakenly dropped call or for an entirely different purpose, the calling party again must provide many of the same inputs that were previously provided in order to navigate the audible menu hierarchy and reach the intended endpoint. Manually traversing an audible menu hierarchy can be tedious and time consuming.

BRIEF SUMMARY

One or more embodiments disclosed within this specification relate to providing automated responses on behalf of a calling party for and/or during a phone call.

An embodiment can include a method. The method includes receiving a first audible prompt from a called system and a response to the first audible prompt from a calling system during a first phone call. The method also includes determining, using a processor, a semantic identifier for the first audible prompt using semantic analysis and storing the semantic identifier of the first audible prompt in association with the response. The method further includes playing the stored response responsive to determining that a semantic identifier for a second audible prompt played to the calling system matches the semantic identifier of the first audible prompt.

Another embodiment includes a system. The system includes a processor programmed to initiate executable operations. The executable operations include receiving a first audible prompt from a called system and a response to the first audible prompt from a calling system during a first phone call. The executable operations also include determining a semantic identifier for the first audible prompt using semantic analysis and storing the semantic identifier of the first audible prompt in association with the response. The executable operations further include playing the stored response responsive to determining that a semantic identifier for a second audible prompt played to the calling system matches the semantic identifier of the first audible prompt.

Another embodiment includes a computer program product. The computer program product includes a computer readable storage medium having program code stored thereon. The program code is executable by a processor to perform a method. The method includes receiving, using the processor, a first audible prompt from a called system and a response to the first audible prompt from a calling system during a first phone call. The method also includes determining, using the processor, a semantic identifier for the first audible prompt using semantic analysis and storing, using the processor, the semantic identifier of the first audible prompt in association with the response. The method further includes playing the stored response using the processor responsive to determining that a semantic identifier for a second audible prompt played to the calling system matches the semantic identifier of the first audible prompt.

DETAILED DESCRIPTION

Figure 1:
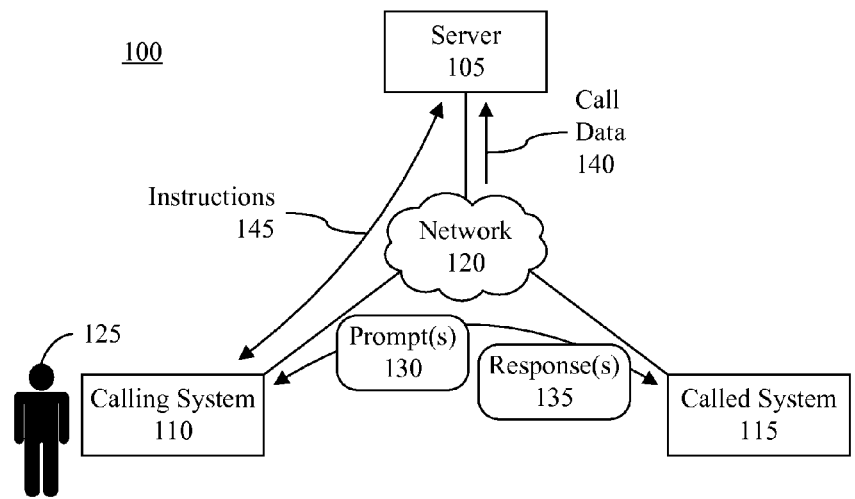
FIG. 1 is a block diagram illustrating an exemplary communication system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. As defined herein, the term "computer-readable storage medium" means a tangible storage medium that contains or stores program code for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

This specification relates to automatically providing responses on behalf of a calling party during a phone call. For example, in one aspect, an enhanced redial service is provided in which semantic analysis is used to determine the appropriate response to play back in answer to a received audio prompt. In accordance with the inventive arrangements disclosed herein, inputs provided from a calling party during a phone call are stored for reuse and/or playback during a same and/or subsequent phone call. As audio prompts from a called party are played to the calling party, the audio prompts are processed using semantic analysis to determine the meaning of each audio prompt. The meaning of each audio prompt is stored in association with the calling party's response, or representation thereof, to the audio prompt.

Subsequently, e.g., within the same phone call or a subsequent phone call, audio prompts received from the called party again are processed using semantic analysis to determine the meaning of each audio prompt. Responsive to determining the meaning of a current audio prompt, the meaning of the current audio prompt is compared with stored meanings of previously received and processed audio prompts. When the meaning of the current audio prompt matches the meaning of a stored audio prompt, the response stored in association with the matched meaning is played during the current call to the called party in answer to the current audio prompt.

By using semantic analysis to determine the meaning of audio prompts, the particular item of information requested via the audio prompt by the called party is determined. The response from the calling party stored in association with the meaning of the audio prompt is presumed to specify or provide the requested item of information. Because the meaning of audio prompts is known, the order in which audio prompts are presented to a calling party becomes inconsequential for proper operation of the automated response system. The called party can present audio prompts to the calling party in virtually any order and the correct response to the audio prompt is played back. Unlike conventional redial systems, the automated response system does not rely upon audio prompts being presented in a same or unchanging order from one call to another.

FIG. 1 is a block diagram illustrating an exemplary communication system 100. Communication system 100 includes a server 105, a calling system 110, and a called system 115. Server 105, calling system 110, and called system 115 communicate with one another over a network 120. In one or more embodiments to be described herein, server 105 is optional.

Network 120 is the medium used to provide communication links between various devices and data processing systems connected together within communication system 100. Network 120 may include connections, such as wire, wireless communication links, or fiber optic cables. Network 120 can be implemented as, or include, any of a variety of different communication technologies such as a WAN, a LAN, a wireless network, a mobile network, a Virtual Private Network (VPN), the Internet, the Public Switched Telephone Network (PSTN), or the like.

Calling system 110 is a device that is operable by a user referred to as a calling party. In this example, the term "user" refers to a human being operating a particular device, i.e., calling system 110. In one example, calling system 110 is implemented as a telephone. The telephone may or may not include memory and audio playback capability. In another example, calling system 110 is implemented as a mobile phone. The mobile phone may be a smart phone that is operable to execute computer programs. In still another example, calling system 110 can be implemented as a computing device with a network connection that is operative to initiate Voice-Over-Internet-Protocol (VoIP) calls. Within this specification, "phone call" or "call" means a two-way voice communication session whether conducted over a mobile telephone network, a conventional telephony network, a VoIP call, e.g., a packet-based network, or the like.

Called system 115 is implemented as an automated attendant. When called, called system 115, for example, can present one or more audible menu choices of an audible menu hierarchy to the calling party thereby allowing the calling party to choose a destination or endpoint for the call. The calling party can provide input as dual-tone multi-frequency (DTMF) selections, or other keyboard data entry. In one aspect, called system 115 can include interactive voice response (IVR) functionality to speech recognize spoken utterances provided by or on behalf of the calling party.

Server 105 is implemented as a data processing system. In one aspect, server 105 is configured to listen in on, or monitor, a phone call placed from calling system 110 to called system 115. For example, server 105 can be conferenced into a phone call by calling system 110. As such, server 105 can receive audio data sent from calling system 110 and audio data sent from called system 115. For purposes of explanation, audio sent from called system 115 is referred to as a prompt, while audio sent from calling system 110 is referred to as a response. It should be appreciated that audio can be sent as digital data or in analog form depending upon the particular implementation of network 120, calling system 110, and called system 115 that is used.

Server 105 is implemented as a data processing system that is operable to semantically process received audio to determine a meaning for the received audio. As used within this specification, the phrase "semantic analysis" refers to a processing technique performed by a data processing system, e.g., a computer, from which meaning of a spoken utterance is determined. As part of semantic analysis, the spoken utterance is speech recognized, thereby being converted into text or another programmatic form that is conducive for analysis using a data processing system. In other cases, an input that is to be semantically processed may already exist in text form so that speech recognition is not required.

Semantic analysis, as performed by a data processing system, can include one or more processing techniques such as natural language understanding, grammatical parsing, and the like. For example, semantic analysis typically includes speech recognizing a spoken utterance to convert the spoken utterance to text. One or more processing techniques are applied to the speech recognized spoken utterance to determine a meaning for the spoken utterance that is stored for subsequent use.

In operation, a calling party 125 uses calling system 110 to initiate a first phone call to a called number associated with called system 115. In one aspect, using calling system 110, calling party 125 invokes an automated response system implemented within server 105 for the first call. Invoking the automated response system conferences server 105 into the first call. Accordingly, server 105 is operative to receive prompts 130 played or generated by called system 115 to calling system 110 during the first phone call. Prompts 130 from called system 115 can include, but are not limited to, computer generated text-to-speech audio, pre-recorded audio that is played back by called system 115, etc. Server 105 further is operative to receive responses 135 from calling party 125 that are generated by, or sent from, calling system 110. Examples of responses include, but are not limited to, keypad input, e.g., DTMF input and/or other alphanumeric input, spoken utterances from calling party 125, and the like.

During the first phone call, called system 115 begins providing one or more prompts 130 to calling system 110. Prompts 130, for example, may ask calling party 125 to select a menu option, provide one or more items of information such as a membership number, phone number, birthdate, address, or the like. Calling party 125 provides one or more responses 135 through calling system 110 to called system 115. Prompts 130 and responses 135 are provided to server 105 as call data 140.

Server 105 is operable to determine which audio is generated by which system. For example, by monitoring for audio or other activity on the connection with calling system 110 and the connection with called system 115, server 105 can determine whether audio that is received originated from calling system 110 (e.g., is a response) or from called system 115 (e.g., is a prompt). Server 105 semantically processes received prompts 130 and determines a meaning for each of prompts 130. The meaning of a prompt specifies the particular item of information that is requested of calling party 125 by called system 115.

For each of prompts 130 processed by server 105, server 105 stores the meaning of the prompt in association with the particular one of responses 135 provided from calling system 110 in answer to the prompt. As such, server 105 builds a list of meaning-response pairs in which each meaning-response pair is formed of a stored meaning for a prompt and a corresponding response from calling party 125 given in answer to the prompt. The meaning-response pairs stored by server 105 are available for subsequent re-use.

In one aspect, the response of a meaning-response pair is stored as an audio recording. In another aspect, the response is stored as a representation of the response provided from calling party 125. For example, in the case of DTMF data, the response can be stored as a numeric digit that, when played back, plays the intended DTMF selection. In the case of a spoken utterance, a text version or other programmatic representation of the spoken utterance can be stored. When played back, the representation of the spoken utterance is played back using text-to-speech technology or another form of playback. The examples provided are intended to illustrate various options for storing a response and are not intended as limitations.

Continuing with the example, calling party 125 initiates a second phone call. In one aspect, the second phone call is made to the same phone number or destination as the first call, i.e., called system 115. In that case, the automated response service provided by server 105 can be used to implement a redial service. In another aspect, however, calling party 125 places the second call to a different phone number or destination. In that case, because server 105 is able to determine meaning for prompts, previously stored meaning-response pairs from the first call can be used to navigate an audible menu hierarchy for a different called system, e.g., a called system other than called system 115.

Calling party 125 can invoke the automated response system implemented by server 105 for the second phone call. As such, server 105 is conferenced in on the second phone call. Server 105 is operable to receive call data including prompts from the called system (whether called system 115 or another, different called system) and responses from calling system 110.

Accordingly, during the second phone call, server 105 receives a prompt from the called system. Server 105 performs a semantic analysis of the prompt to determine a current meaning. The current meaning is compared with the stored meaning-response pairs previously determined for calling party 125, e.g., from the first phone call. If the current meaning matches a meaning of a meaning-response pair, server 105 plays the response of the matched meaning-response pair is played to the called system.

If the current meaning does not match a meaning of any stored meaning-response pairs, server 105 reverts to a mode in which calling party 125 is expected to provide a response. The described process can continue with server 105 providing one or more pre-stored responses on behalf of calling party 125 to called system 115 or another called system in answer to prompts. As such, calling party 125 is relieved from having to manually navigate through a menu hierarchy presented by the called system.

In the example described, the meaning-response pairs are stored in server 105. In another aspect, the response portion of each meaning-response pair can be stored in calling system 110 as opposed to in server 105. For example, while server 105 stores determined meanings for prompts from called system 115, the responses to the prompts are not stored on server 105. Rather, the responses can be stored in calling system 110, which is independent and/or remote from server 105. Despite being stored in calling system 110, each stored response still is associated with a meaning stored in server 105. Storing response data in calling system 110 may provide piece of mind to calling parties in that sensitive data is not stored remotely, but rather in the calling system in possession of the calling party.

When response data is stored in calling system 110, rather than server 105 playing responses back to the called system on behalf of calling party 125, server 105 sends one or more instructions 145 to calling system 110 instructing calling system 110 to play back the correct response stored therein. For example, responsive to determining the meaning of a current prompt from called system 115, server 105 determines whether a meaning-response pair matches the current prompt. If so, server 105 sends instructions 145 to calling system 110 to play the response of the of the meaning-response pair that matches the meaning of the current prompt. In this regard, server 105 stores an identifier for each response as opposed to the response itself. When calling system 110 receives an instruction to play a particular response, as determined from the identifier provided in instructions 145, calling system 110 plays back the response indicated by the received identifier.

Figure 2:
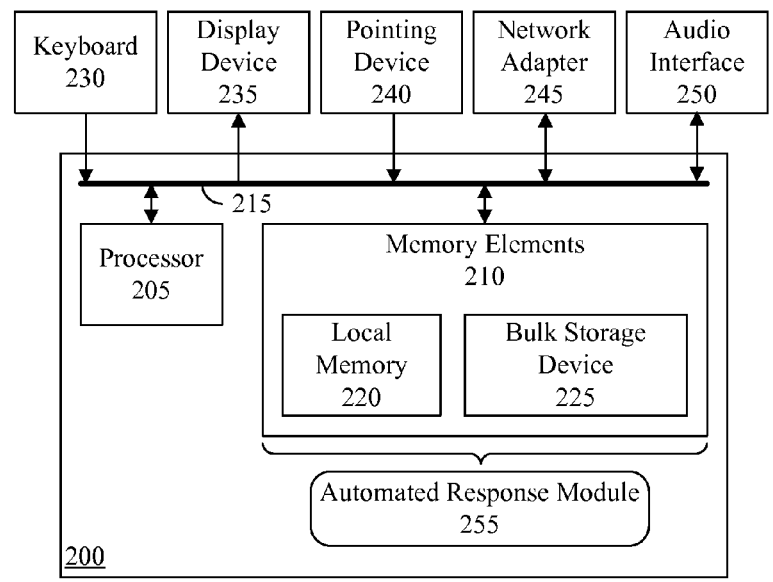
FIG. 2 is a block diagram illustrating an example of a data processing system.

FIG. 2 is a block diagram illustrating an example of a data processing system (system) 200. In one aspect, system 200 illustrates an exemplary implementation and/or architecture for server 105 of FIG. 1. In another aspect, system 200 illustrates an exemplary implementation and/or architecture for calling system 110, e.g., in the case where calling system 110 is implemented as a smart phone, a portable computing device, or the like.

As pictured, system 200 can include at least one processor 205, e.g., a central processing unit, coupled to memory elements 210 through a system bus 215 or other suitable circuitry. System 200 can store program code within memory elements 210. Processor 205 executes the program code accessed from memory elements 210 via system bus 215 or the other suitable circuitry.

Memory elements 210 include one or more physical memory devices such as, for example, local memory 220 and one or more bulk storage devices 225. Local memory 220 refers to RAM or other non-persistent memory device(s) generally used during actual execution of the program code. Examples of bulk storage device 225 include, but are not limited to, a hard disk drive (HDD), solid state drive (SSD), or other persistent data storage device. System 200 also can include one or more cache memories (not shown) that provide temporary storage of at least some program code in order to reduce the number of times program code must be retrieved from a bulk storage device during execution.

Input/output (I/O) devices such as a keyboard 230, a display device 235, and a pointing device 240 optionally can be coupled to system 200. The I/O devices can be coupled to system 200 either directly or through intervening I/O controllers. One or more network adapters 245 also can be coupled to system 200 to enable system 200 to become coupled to other systems, computer systems, remote printers, and/or remote storage devices through intervening private or public networks. Modems, cable modems, wireless transceivers, and Ethernet cards are examples of different types of network adapters 245 that can be used with system 200.

In one aspect, system 200 is implemented as a computer or other programmable data processing apparatus that is suitable for storing and/or executing program code. It should be appreciated, however, that system 200 can be implemented in the form of any system including a processor and memory that is capable of performing and/or initiating the functions and/or operations described within this specification. As noted, exemplary implementations of system 200 include, but are not limited to, telephones, mobile phones, tablets, laptop computers, desktop computers, or the like.

System 200 can be implemented in any of a variety of different form factors. As a server, for example, system 200 may or may not include I/O devices such as keyboard 230, display 235, and/or pointing device 240. As a calling system, system 200 can be implemented as a personal computer, a portable computer, e.g., a laptop, a tablet, a mobile communication device, or the like. For example, system 200 can include I/O devices such as keyboard 230, display device 235, and pointing device 240 in any of a variety of different configurations, e.g., as an integrated display device in the form of a flat panel display or touchscreen that replaces keyboard 230 and/or pointing device 240, etc. When implementing a calling system, system 200 further includes an audio interface 250. Audio interface 250, for example, can include transductive elements such as a microphone and a speaker or other audio output port.

As pictured in FIG. 2, memory elements 210 can store program code including, but not limited to, an operating system (not shown) and application software. For example, as pictured, memory elements 210 include an automated response module 255. Automated response module 255, when executed, performs the operations and/or functions described within this specification. It should be appreciated that automated response module 255, including any parameters and/or attributes utilized by automated response module 255, e.g., meanings, semantic identifiers, response data, phone numbers, settings, etc., are functional data structures that impart functionality when employed as part of system 200.

Figure 3:
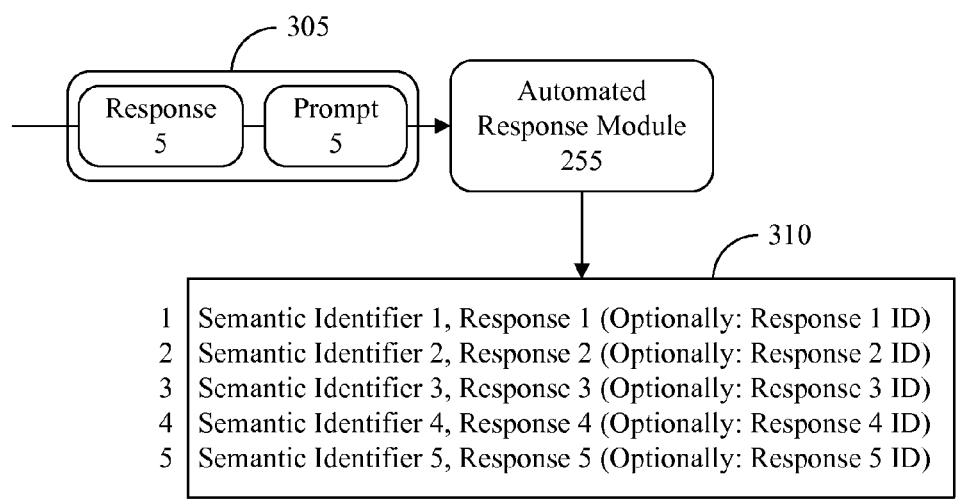
FIG. 3 is a block diagram illustrating exemplary meaning-response pairs.

FIG. 3 is a block diagram illustrating exemplary meaning-response pairs. As pictured in FIG. 3, call data 305 is received by automated response module 255. In one aspect, automated response module 255 is executing within a server such as server 105 of FIG. 1. In another aspect, automated response module 255 is executing within a calling system such as calling system 110 of FIG. 1.

Call data 305 includes a prompt 5 and a response 5. As noted, automated response module 255 is able to distinguish between prompt 5 and response 5. Automated response module 255 performs semantic analysis upon prompt 5. Accordingly, automated response module 255 determines a meaning for prompt 5. The meaning of prompt 5 indicates, or specifies, the particular item of information that the called system is requesting from the calling party.

In one aspect, the meaning of a prompt can be expressed as a semantic identifier. A "semantic identifier" is a tag, symbol, label, combination of symbols or characters, word, or combination of words that specifies or indicates a meaning of an audio prompt. The semantic identifier is determined from a semantic analysis of the audio prompt. One example of a semantic identifier is "mailing address" indicating that the prompt is requesting the mailing address of the calling party. Other examples of semantic identifiers include, but are not limited to, "shipping address," "billing address," "credit card number," "expiration date," "email address," "first name,"

"birth date," "phone number," or the like. These phrases can be used as semantic identifiers. Alternatively, other symbols representative of the phrases such as an index value can be used. In any case, each semantic identifier specifies a particular item of information that is requested by a prompt.

Automated response module 255 generates meaning-response data 310. As shown, for purposes of illustration, meaning response data 310 includes a plurality, e.g., 5, meaning-response pairs numbered 1, 2, 3, 4, 5. In an embodiment where responses are stored with meanings, a semantic identifier is stored in association with the response provided from the calling party in answer to the prompt from which the semantic identifier was determined. Such may be the case, for example, where automated response module 255 is executing on a server or on a calling device that is powerful enough to perform the operations described.

Meaning-response data 310 illustrates another embodiment where responses are stored separately from the semantic identifiers. In that case, rather than storing each response in association with a meaning, a response identifier (ID) is stored in association with the meaning. The response specified by the response ID is stored within the calling system. Accordingly each meaning-response pair includes a semantic identifier stored in association with a response ID. The response ID, when provided to a calling system, indicates the particular response stored therein that is to be played. As previously noted, the response can be stored in any of a variety of different forms whether recorded audio, speech recognized text, or another programmatic representation.

In the example shown in FIG. 3, automated response module 255 receives prompt 5 and response 5 during a phone call. Automated response module 255 performs semantic analysis upon prompt 5 to determine semantic identifier 5. Semantic identifier 5 indicates the meaning of prompt 5 and the item of information requested by prompt 5 from the calling party. Automated response module 255 stores semantic identifier 5 in association with either response 5 or response 5 ID. In the case where response 5 ID is stored, automated response module 255 instructs the calling system to store response 5 therein for subsequent reuse.

Meaning-response data 310 is stored on a per calling party basis. In one aspect, meaning-response data 310 further can be stored on a per called phone number basis. Accordingly, for each calling party, a profile can be created. Within that profile for the calling party, meaning-response pairs are stored in association with a called phone number, contact, etc. In such a configuration, data is not shared across different called phone numbers. Thus, if a meaning-response pair for a billing address is determined in one phone call placed by a calling party to a first called number, that meaning-response pair is not used or accessed for purposes of playback during a phone call from the calling party to any other called number that is different from the first called number.

In another aspect, meaning-response data 310 can be shared from one called phone number to another. In that case, if the billing address of the calling party is determined during a phone call to a first phone number, the meaning-response pair for the billing address can be used during a second phone call to a second phone number that is different from the first phone number. In one aspect, whether meaning-response pairs are shared among different called phone numbers can be a user-specifiable setting.

Figure 4:
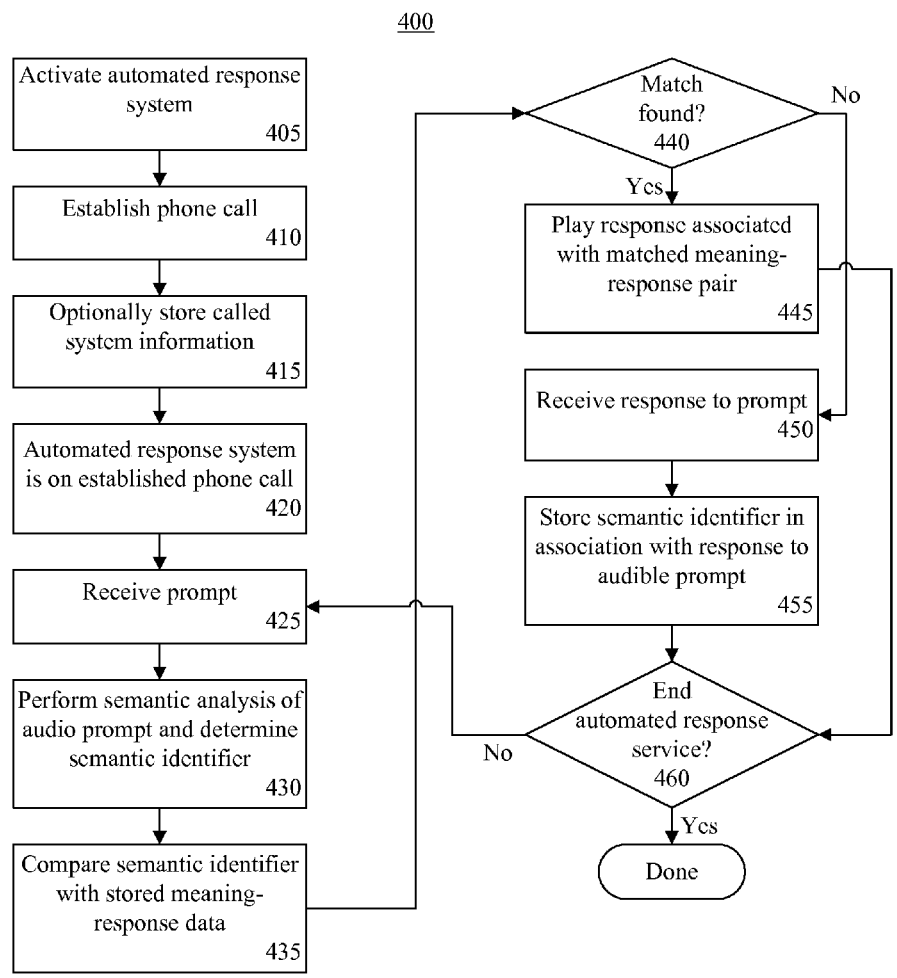
FIG. 4 is a flow chart illustrating an exemplary method of operation for an automated response system.

FIG. 4 is a flow chart illustrating an exemplary method 400 of operation for an automated response system. In one aspect, method 400 can be performed by an automated response system implemented as a server. In another aspect, method 400 can be performed by a server operating cooperatively with a calling system. In still another aspect, where the calling system includes sufficiently powerful processing capabilities, method 400 can be implemented by the calling system.

Method 400 can begin in block 405 where the calling party activates the automated response system. In one aspect, the calling party can activate the automated response system by pressing one or more keys on the calling system. In another aspect, the calling party can activate the automated response system using an application executing on the calling system. In still another aspect, the calling party can activate the automated response system using voice commands issued to the calling system.

In the case where the automated response system is implemented in the calling system, the automated response system simply can be activated. In the case where the automated response system is implemented in a remote server, the calling system can contact the remote server and issue an instruction to activate or invoke the automated response system. In other cases, e.g., where responses are stored on the calling system and meanings are stored on the remote server, the calling system can activate a client-based function or application implementing a portion of the automated response system while also contacting the remote server to activate a server-side portion of the automated response system.

In block 410, the calling system, under control of the calling party, initiates a phone call to a called system. The phone call is established in response to the called system answering the phone call. In one aspect, the calling party dials a phone number for the called system. In another aspect, the calling party may choose one or more redial options corresponding to previously dialed phone numbers. It should be appreciated in another aspect, the phone call can be established prior to activation of the automated response system. Further, establishing the phone call, e.g., redialing, can be implemented responsive to a calling party selection of such an option available in a client application executing in the calling system.

In block 415, the automated response system optionally stores the called system information. The called system information can be stored in association with any meaning-response data generated and stored for the current phone call that is further stored in association with the calling party. In one aspect, the called system information is the phone number of the called system. The called system information further can include or specify different endpoints or destinations within a given organization or for a particular phone number. For example, the called system information can indicate a called phone number and specify a destination such as "reservations." This means that multiple destinations or endpoints can be specified for a same called number. The same called number can be stored in association with an endpoint designation such as "representative" as a different entry having different meaning-response data than the "reservations" endpoint for the same telephone number. Appreciably, meaning-response pairs stored in association with each different endpoint will differ despite both endpoints having a same dialed phone number. The called system information can be stored in the calling system, in the server, or both.

In block 420, the automated response system is on the established phone call. If implemented in whole or in part as a separate system from the calling system, the separate portion of the automated response system is conferenced into the established phone call. Accordingly, the automated response system is able to receive audio from the calling system and audio from the called system. In block 425, the automated response system receives a prompt from the called system. In block 430, the automated response system performs semantic analysis of the prompt and, in so doing, determines a semantic identifier for the prompt.

In block 435, the automated response system compares the semantic identifier with any stored meaning-response data for the calling party. If the meaning-response data for the calling party is not shared across different called phone numbers, the comparison of the semantic identifier for the current prompt is limited to the meaning-response data for the same, or current, phone number. Otherwise, the semantic identifier for the current prompt is compared with meaning-response data for a plurality or all phone numbers that may have been stored for the calling party.

In block 440, the automated response system determines whether a match has been found. If so, method 400 continues to block 445. If not, method 400 proceeds to block 450. In another aspect, the automated response system can proceed to block 450 in the event that the automated response system is unable to determine the meaning of the current prompt. In block 445, where the semantic identifier has been found to match a semantic identifier of a stored meaning-response pair, the automated response system plays the stored response from the matched meaning-response pair. After block 445, method 400 continues to block 460.

In block 450, the automated response system receives a response from the calling party in answer to the prompt. In one aspect, when the automated response system does not have a meaning-response pair that matches the semantic identifier for the current prompt, the automated response system gives control to the calling system so that the calling party may provide a response to the prompt. The calling party can be notified of the transfer of control and the expectation that the calling party is to provide a response to the called system.

Continuing with block 455, the automated response system stores the semantic identifier for the current audio prompt in association with the response to the audio prompt obtained from the calling party. The response, for example, in this example is recorded audio (e.g., user spoken utterance), one or more DTMF tones or indications of DTMF tones thereby allowing subsequent regeneration of such tones, or the like.

In block 460, the automated response system determines whether to terminate. If the automated response system is stopped, method 400 can end. If the automated response system is not stopped or otherwise terminated, method 400 can loop back to block 425 to continue processing.

The automated response system can be terminated or otherwise stopped responsive to any of a variety of conditions whether detected automatically by the automated response system itself or at the request of the calling party. The calling party, for example, may terminate the automated response system by providing a termination command, whether a user spoken utterance, a key command, or other user input provided through the calling system. In another example, the automated response system can terminate when each response stored in association with the called number has been played.

In some cases, the automated response system may be unable to determine an appropriate response. For example, if the automated response system is presented with a plurality of menu options such as "say representative to speak with a representative," "say balance to hear your current account balance," or the like, the automated response system is unable to know the intention of the calling party. Such is the case where the calling party has created one set of meaning-response data for the called number, but multiple endpoints are available to the calling party. In that case, the automated response system can return control to the calling party to answer the audio prompt or can stop operation.

In the case where the calling party has created multiple redial options for the same telephone number, e.g., one redial option for each of a plurality of different endpoints, the automated response system can respond correctly. In that case, for example, the particular meaning-response pairs stored for a redial option to reach a bank representative will play a response to select the representative option. By comparison, the redial option for obtaining automated balance information for the same phone number will specify meaning-response pairs that play a response to select the automated balance information.

FIG. 4 can repeat as may be required so that the calling party can initiate further phone calls and utilize the automated response system. As the calling party continues to utilize the automated response system, the collection of meaning-response pairs for the calling party continues to grow and becomes more comprehensive. Further, the calling party may create further redial options, where each redial option specifies a plurality of meaning-response pairs.

Figure 5:
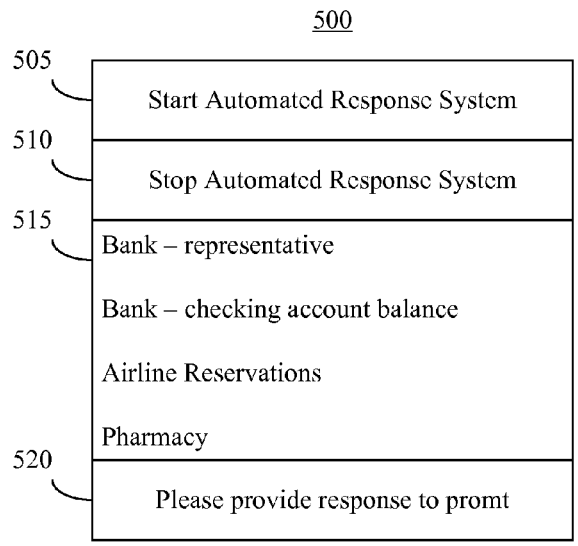
FIG. 5 is a block diagram illustrating an example of a user interface (UI) for an automated response system.

FIG. 5 is a block diagram illustrating an example of a user interface (UI) 500 for an automated response system. UI 500 can be presented to a calling party by a display of a calling system. Within UI 500, a control 505 is provided. Responsive to selection of control 505, the automated response system is started or invoked. For example, prior to, or after, dialing a phone number, a calling party can launch an application and select control 505, which starts the automated response system. At any point in time, the calling party may select control 510 to stop operation of the automated response system.

Section 515 includes a plurality of controls. Each control can be a selectable endpoint for a contact or phone number. In this example, when the calling party selects "Bank—representative," the calling system initiates a phone call to the phone number stored for the "Bank." Further, the various meaning-response pairs for reaching a representative that have been stored are used to navigate an audible menu hierarchy to reach a representative. When the "Bank—checking account balance" control is selected, the calling system dials the same phone number as the "Bank—representative" option. The particular meaning-response pairs available, however, are different and intended to select the option of the audible menu hierarchy to check one's checking account balance automatically. For example, the meaning-response pairs for "Bank—checking account balance" will include a meaning-response pair for one's checking account number, a meaning-response pair for obtaining balance information, etc. By comparison, the "Bank—representative" control causes playback of a response asking to speak with a representative when presented with that prompt.

Other controls are shown for reaching airline reservations and a pharmacy. UI 500 can include an indicator 520. Indicator 520 can change state, e.g., appearance or color, to indicate to the calling party that he or she must provide a response to a prompt. In cases where the automated response system does not have a stored response or is unable to determine the appropriate response to play, indicator 520 can change state to signal the calling party to provide the response.

Figure 6:
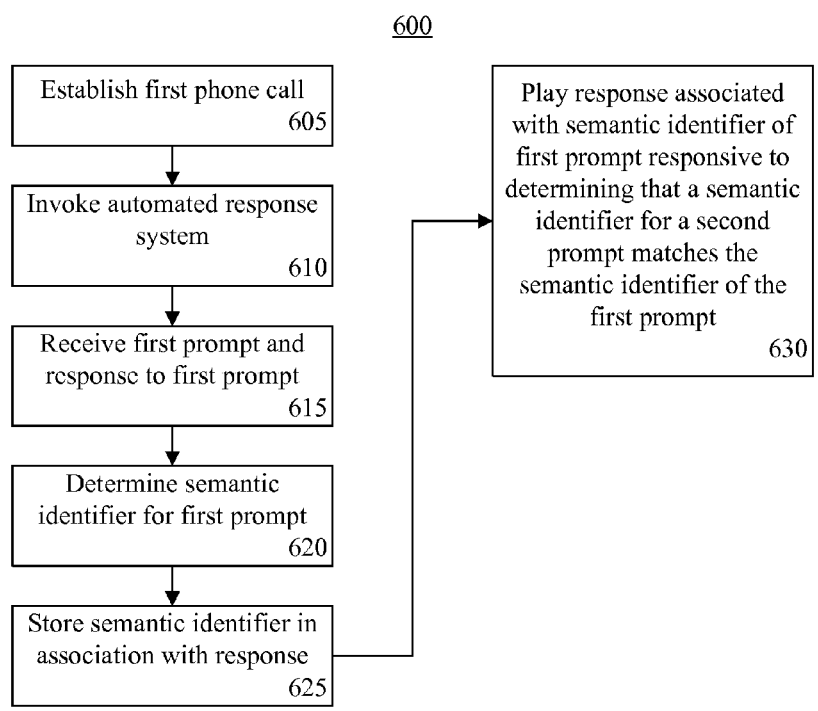
FIG. 6 is a flow chart illustrating another exemplary method of operation for an automated response system.

FIG. 6 is a flow chart illustrating another exemplary method 600 of operation for an automated response system. Method 600 can be performed by an automated response system implemented as a server, by a server operating cooperatively with a calling system, and/or by a calling system.

In block 605, a first phone call is established between a calling system and a called system. The calling system is operated by a calling party. In block 610, the automated response system is invoked. In block 615, the automated response system receives a first prompt, e.g., an audible prompt, from the called system and a response to the first prompt provided from the calling system.

In block 620, the automated response system determines a semantic identifier for the first prompt using semantic analysis. In block 625, the automated response system stores the semantic identifier of the first prompt in association with the response. In one aspect, the automated response system stores the semantic identifier of the first prompt in association with the response only responsive to determining that the semantic identifier does not match any semantic identifier for previously received prompts for the calling system (and calling party).

In block 630, the automated response system plays the response stored in block 625 (e.g., the response associated with the semantic identifier of the first prompt) responsive to determining that a semantic identifier for a second prompt played to the calling system matches the semantic identifier of the first prompt. In one aspect, the response is played in block 630 during a second and different phone call. The second phone call can be to the same called system as the first phone call or a different called system corresponding to a different phone number. In another aspect, the response is played during the same, e.g., the first, phone call.

The inventive arrangements disclosed within this specification provide an automated response system that can be used by calling parties to avoid having to provide responses to various prompts of audible menu hierarchies presented by automated attendants. By utilizing semantic analysis, the order in which a called system presents prompts to the calling party is immaterial to whether a correct response is provided. Despite a change in the ordering of prompts presented by the automated attendant, the automated response system is able to provide the correct response.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
a processor programmed to initiate executable operations comprising:
receiving a first audible prompt from a called system and a response to the first audible prompt from a calling system during a first phone call;
determining a semantic identifier for the first audible prompt using semantic analysis;
storing the semantic identifier of the first audible prompt in association with the response to generate a meaning-response pair;
receiving, from the calling system, a selection of one of a plurality of endpoints associated with the called system and each of the plurality of endpoints are associated with a plurality of meaning-response pairs, wherein the selection is made during, an active phone call;

determining that a semantic identifier for a second audible prompt played to the calling system matches the semantic identifier of the first audible prompt; and Playing the stored response in responsive to the selection and matching.

2. The system of claim 1, wherein
the response is played during a second phone call.

3. The system of claim 2, wherein
the second phone call is to a same phone number as the first phone call.

4. The system of claim 2, wherein
the second phone call is to a different phone number than the first phone call.

5. The system of claim 2, wherein
the active call is the second phone call.

6. The system of claim 1, wherein
the stored response comprises a spoken utterance of a calling party.

7. The system of claim 1, wherein
the response is stored in the calling system and the semantic identifier of the first audio prompt is stored in a data processing system independent of the calling system.

8. The system of claim 6, wherein
the stored response is played during the first phone call.

9. A computer readable storage device having a program code stored thereon, the program code executed by a processor to perform:
   receiving, using the processor, a first audible prompt from a called system and a response to the first audible prompt from a calling system during a first phone call;
   determining, using the processor, a semantic identifier for the first audible prompt using semantic analysis;
   storing the semantic identifier of the first audible prompt in association with the response to generate a meaning-response pair;
   receiving, from the calling system, a selection of one of a plurality of endpoints associated with the called system and each of the plurality of endpoints are associated with a plurality of meaning-response pairs, wherein the selection is made during, an active phone call;
   determining that a semantic identifier for a second audible prompt played to the calling system matches the semantic identifier of the first audible prompt; and Playing the stored response in responsive to the selection and matching.

10. The computer readable storage device of claim 9, wherein
the response is played during a second phone call.

11. The computer readable storage device of claim 10, wherein
the second phone call is to a same phone number as the first phone call.

12. The computer program product of claim 10, wherein
the second phone call is to a different phone number than the first phone call.

13. The computer readable storage device of claim 10, wherein
the active call is the second phone call.

14. The computer readable storage device of claim 9, wherein
the active call is the first phone call.

15. The computer readable storage device of claim 9, wherein
the response is stored in the calling system and the semantic identifier of the first audio prompt is stored in a data processing system independent of the calling system.

16. The computer readable storage device of claim 9, wherein
the stored response is played during the first phone call.

17. The computer readable storage device of claim 9, wherein
storing the semantic identifier of the first audible prompt in association with the response is performed responsive to determining that the semantic identifier of the first audible prompt does not match a semantic identifier of any previously received audible prompts.

\* \* \* \* \*